Patented May 12, 1953

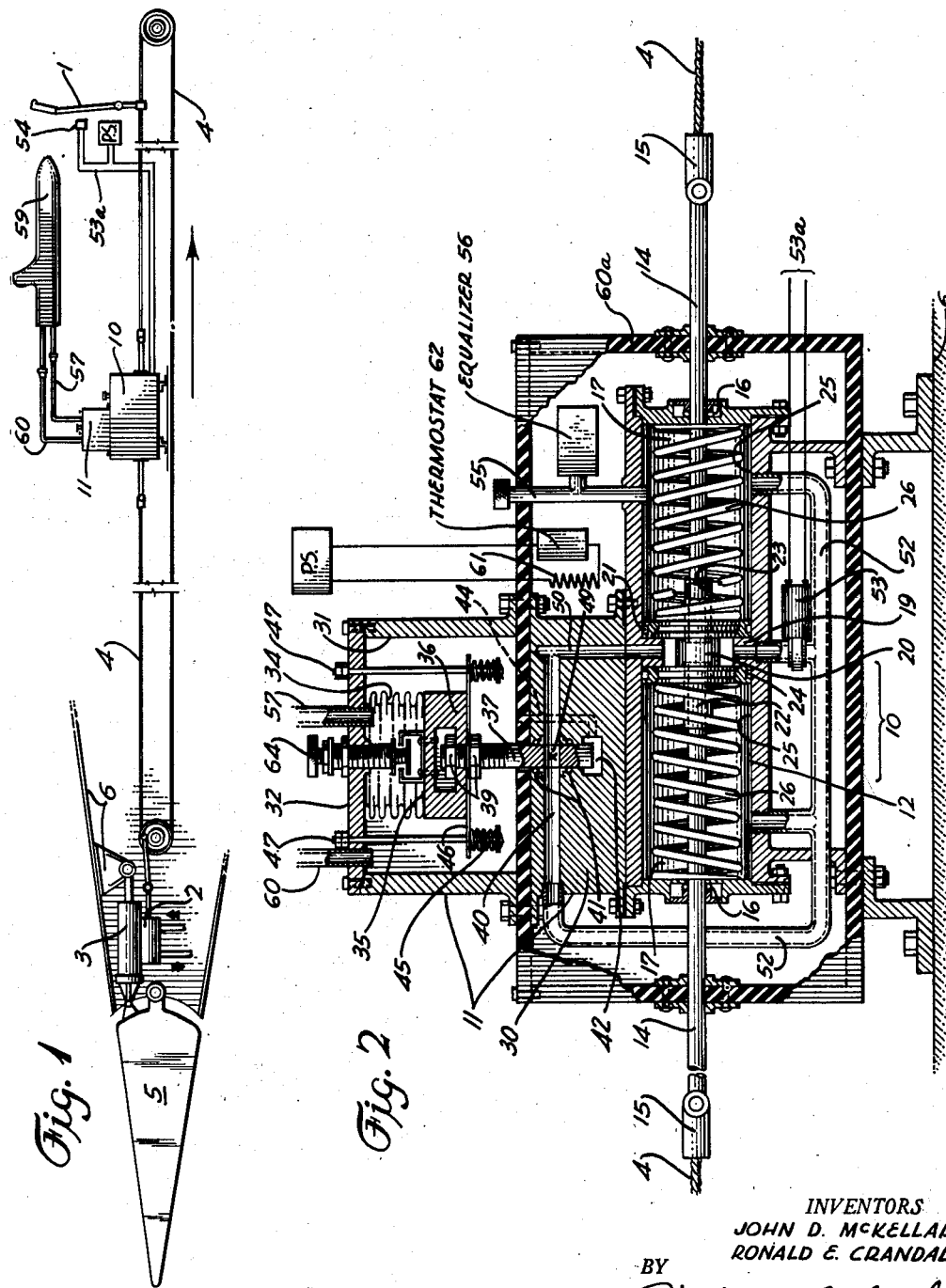

2,638,289

UNITED STATES PATENT OFFICE 2,638,289

HYDRAULIC STICK CONTROL

John D. McKellar and Ronald E. Crandall, Los Angeles, Calif., assignors to Northrop Aircraft, Inc., Hawthorne, Calif., a corporation of California Application February 5, 1949, Serial No. 74,728

9 Claims. (Cl. 244—83)

This invention relates to controls for use in airplanes, and more particularly to a means and method of regulating the rate at which the stick or control column of an airplane can be moved by the pilot.

In an airplane having a control surface operated wholly by auxiliary power, for example, the pilot's control stick or column sends control signals only to the control surface operating motors, and no aerodynamic forces acting on the control surfaces can be felt by the pilot. In large, high-speed airplanes having full powered control surfaces, the pilot can easily move the stick to positions where the airplane might become greatly overloaded, even to destruction, particularly when the surface is moved in elevation controlling directions. A number of devices have been developed to prevent the pilot from overloading such an airplane. Ashkenas, for example, in application Serial No. 52,367, filed October 1, 1948, now abandoned, derived a force from the airstream flowing past the airplane, and applied that force to center the control stick to provide a feel on the controls; when moved away from neutral, simulating the aerodynamic forces acting on the controlled surfaces.

Again, Feeney, in application Serial No. 69,956, filed January 8, 1949, measured the vertical accelerations acting on the airplane, and applied a force to the stick varying with such accelerations to tend to move the stick in a direction to reduce the acceleration being experienced. Other systems (Feeney, application Serial No. 24,226, filed April 30, 1948) have used combinations of aerodynamic forces and springs to provide the desired centering forces.

The present invention differs radically from any of the aforesaid devices, in that all stick centering forces are preferably fixed in value, but the rate at which the stick can be moved is placed under the control of a force derived from airspeed, or a force derived from vertical acceleration, or a force which is a resultant of forces derived from both airspeed and vertical acceleration.

It is an object of the present invention to provide a means and method of controlling the rate at which airplane controls can be moved; this rate being varied in a manner tending to prevent the airplane from being overloaded in flight by the pilot.

It is another object of the invention to provide a means and method of varying the rate at which the control column of an airplane can be moved by the pilot, inversely in accordance with loads acting on said airplane.

It is still another object of the invention to prevent aerodynamic overloading of an airplane by the airplane pilot.

Other objects and advantages of the present invention will be apparent from the ensuing description of the appended drawings in which:

Figure 1 is a schematic diagram of a preferred elevator control system embodying the present invention.

Figure 2 is a longitudinal sectional view of the rate control mechanism utilized in the system of Figure 1.

The control system shown in Figure 1 comprises the usual control stick 1 which, of course, is fully equivalent to a control column with a wheel or wheel sector for aileron control. As the device will be described as operating on the elevator controls, the stick connections to the ailerons are not shown.

Stick 1 is connected, for example, to operate a valve 2 of a hydraulic motor 3 of the cylinder and piston type, through cable 4, the cylinder of the motor being connected to an elevation control surface 5, with the piston of the motor connected to the frame 6 of the airplane. The elevator surface 5 will be moved in accordance with the direction and amplitude of stick movement. However, no forces acting on the elevator will be transmitted back to the pilot.

The rate of stick movement is under the control of a hydraulic assembly 10 positioned to act on stick 1, the cylinder assembly being under the control of a force measuring assembly 11 preferably mounted on hydraulic assembly 10.

The hydraulic assembly 10 comprises a cylinder 12 through which a rod 14 passes, this rod being connected to cable 4 by the use of couplings 15 on each side of the cylinder 12. Rod 14 is sealed by end seals 16 as it passes through the cylinder ends. Cylinder 12 is divided into two end chambers 17 by a central internally extending ridge 19.

The rod, within the cylinder, has a shoulder 20 formed thereon, this shoulder, when the stick 1 is centered, being in the plane of central ridge 19. Positioned in each chamber 17 and slideably mounted on rod 14 is a piston 21 having an outwardly extending shoulder 22 sealed by an O ring 23 to rod 14 and sealed as by piston ring 24 to the interior surface 25 of the cylinder. Each piston is adapted to be picked up and moved outwardly only by shoulder 20 and is returned inwardly by a centering spring 26 positioned in the same chamber as the piston. In the absence of other forces, springs 26 will center the stick, and except for piloting forces applied directly to the stick by the pilot of the airplane, no other stick centering forces are provided.

However, the rate at which the pistons 21 can be moved by the stick is under the control of the force measuring assembly 11.

This force measuring assembly comprises an assembly block 30 mounted on cylinder 12 and supporting a pressure chamber 31, closed by a cover 32. Mounted on cover 32 to extend into pressure chamber 31 is a flexible cylindrical bellows 34 closed inwardly by bellows plate 35 on which is mounted a weight 36.

On the inner end of weight 36 and mounted centrally thereof, a valve rod 37 is extended, this valve rod being adjustable as to length with respect to weight by the use of nuts 39, so that valve rod 37 can be extended or retracted without turning the rod.

Valve rod 37 extends into the assembly block 30 to intersect a fluid duct 40. Fluid in this duct is isolated from pressure chamber 31 by seals 41 between valve rod 37 and the assembly block on each side of fluid duct 40.

The force measuring assembly 11 is positioned in the airplane with valve rod 37 vertical, when the longitudinal axis of the airplane is horizontal, so that movement of valve rod 37 by weight 36 will reflect vertical accelerations applied to the airplane.

The lower end of valve rod 37 enters an equalizing cavity 42, this cavity being connected for pressure equalization to pressure chamber 31 by equalizing duct 44.

Balancing springs 45 are provided bearing against end plate 46 on weight 36, the compression of these springs being under the control of adjustment screws 47 extending upwardly through the chamber 31 to support weight 36 against gravity and to control its position when the airplane is at rest. The restoring forces acting on weight 36 when the latter is displaced, can be distributed as desired between bellows 34 and springs 45.

Valve rod 37 is provided with a fluid bore 49 of substantially the same size as fluid duct 40 and registering therewith when the airplane is at rest, so that a free fluid path is provided through duct 40. One end of duct 40 is connected by cross duct 50 to cylinder 12, entering the cylinder centrally at the central ridge 19. The other end of duct 40 is connected to both ends of cylinder 12 through end pipe connection 52.

End pipe connection 52 is centrally connected to the interior of cylinder 12 through a bypass valve 53, which may be electrically operated through wires 53a by the pilot of the airplane, as by switch 54, conveniently located.

The hydraulic cylinder and connected piping is filled with hydraulic fluid through an inlet 55 and the hydraulic system also has attached thereto a temperature equalizer 56, as is well known in the art.

The interior of the bellows 34 is connected to a source of dynamic air pressure, such as, for example, a pressure line 57 from a pitot head 59 (Figure 1) mounted on the airplane and projecting into the airstream, and the pressure chamber 31 is connected to a source of static pressure, such as, for example, static pressure line 60 from the pitot head 59.

In operation of the device, the stick is normally centered by the forces exerted by springs 26, so that as the stick is moved away from neutral, these forces will continue to act on the stick until the stick is again centered.

As the stick is moved away from neutral, one or the other of the pistons 21 will be picked up by shoulder 20 on rod 14 and will be moved outwardly in its respective chamber 17. This movement of a piston will cause fluid to flow through fluid duct 40 and the bore 49 in valve rod 37. When the bore coincides with the duct, free passage of the fluid from the end of the cylinder to the center of the cylinder is provided, and very little opposition to stick movement will be felt by the pilot. However, as airspeed increases, and assuming zero vertical acceleration, the bellows 34 will expand and will move valve rod 37 so that bore 49 and duct 40 no longer coincide and the flow of fluid through duct 40 will be restricted. This restriction will increase with increase in airspeed, thereby reducing the speed at which the control stick can be moved in the direction tending to increase airplane load factor. Movement of the stick in the opposite direction, i. e., with the shoulder 20 on rod 14 returning to central position in the cylinder, is not impeded as the rod 14 slides freely on the displaced piston, which is then returned to the central position by the associated compressed spring at the rate permitted by the position of valve rod 37. Thus, while the device resists movement of the stick in directions tending to increase airplane load factor, it does not resist movement of the stick in the opposite direction, nor is any pressure exerted on the stick when held stationary by the pilot, other than the pressure exerted by springs 26.

If desired, the maximum rate of movement of the stick can be controlled in accordance with airspeed alone, but as airplanes can be overloaded at moderate speeds by movement of controls which can cause large vertical accelerations to be imparted to the airplane, we prefer to also regulate the rate at which the stick can be moved in accordance with vertical acceleration. This action is provided by weight 36 which acts as an accelerometer mass to cause movement of valve rod 37 when the airplane is subjected to vertical accelerations, either positive or negative. The movement of the valve rod 37 will be in the direction reducing the rate at which the stick can be moved as acceleration increases, and again, will only restrict the rate of stick movement in the direction which would increase the acceleration.

In practical operation, the device can be set to impose a well defined resistance to movement of the stick in a direction tending to increase the loads on the airplane, when the loads are substantially equal to the design load factor of the airplane. The resistance to the stick movement can be made very large, for example, as the airplane loads approach 1.25 times the design load factor, and if desired can be made so high as to entirely prevent stick movement by the pilot in a direction to increase the load on the airplane when the airplane load approaches 1.5 times the design factor. At all times, the stick can be moved easily in the direction to reduce the load on the airplane.

As it is always possible that the device may function improperly or that certain conditions might obtain in a military emergency for example, where the stick should be freed from the resistance provided by the force measuring assembly, the emergency bypass valve 53 can be opened at any time by the pilot to permit fluid to pass freely from the ends of the cylinder to the center thereof as the stick is moved. The bypass valve 53 is also usually opened during take-off and landing procedure.

By proper regulation of the size of bellows 34, the mass of weight 36, and the contour of the fluid restricting passages at the valve rod 37, any desired rate curve can be provided in accordance with the individual characteristics of particular airplanes of given design.

One of the important features of the present invention is that while a high resistance to movement of the stick can be developed by the device this resistance is not placed on the stick as a centering force so that the pilot is not required to apply a heavy force to hold the stick in a position where high speeds and high vertical accelerations are being experienced by the airplane.

It is also to be pointed out that the device described above can be utilized to vary the rate at which the stick can be moved as a function of vertical acceleration alone, by eliminating the pressure chamber 31 and pressure in bellows 34. In this case a stick force varying in accordance with airspeed can be applied to the stick as a centering force, as set forth in the Ashkenas application cited hereinbefore.

Accordingly, the device of the present invention can be set up to control the rate of stick movement in accordance with airspeed, with vertical acceleration, or both as in the preferred embodiment described herein.

As the device above described may be required to be operated at both high and low altitudes, and will thus be subjected to a wide temperature range, it is preferred that all liquid carrying portions of the device be enclosed in a heat insulating enclosure 60a maintained at a substantially constant temperature by heater 61 and thermostat 62 from power source P. S. This insures constant viscosity of the fluid during flight with a resultant constant rate of movement control in accordance with valve rod position.

Also, in case it is not deemed advisable in some installations to permit the control stick or column to be absolutely prevented from movement in a load increasing direction, a small permanent bypass determining a minimum rate of stick movement may be provided around the valve rod 37 in duct 40 or, as is preferred stop means 64 can be provided, adjustable from outside the chamber 31 to prevent movement of the valve rod 37 to positions where all flow is stopped through duct 40. This latter stop means can also be utilized to provide a differential minimum rate of movement of the stick at the opposite ends of travel of the valve rod 37.

While the device as described herein is ideally adapted for use with a control system having a fully powered control surface providing no feelback to the pilot, a device controlling the rate of stick movement in accordance with vertical acceleration, as described herein, is also adaptable for use when a control surface is operated by the pilot with various degrees of feel-back.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown but that the means and construction herein disclosed comprise a preferred form of putting the invention into effect, and the invention is therefore claimed in any of its forms or modifications within the legitimate and valid scope of the appended claims.

What is claimed is:

1. In an airplane having a control surface moved in accordance with movements of a pilot's control element, a cylinder adapted for holding a fluid, a central ridge in said cylinder extending internally from the cylinder bore, a rod movable with said control element entering said cylinder and having a central shoulder thereon smaller in diameter than the inner diameter of said ridge, a piston slidably mounted on said rod on each side of said shoulder, one of said pistons on each side of said ridge, the periphery of each of said pistons being sealed to the interior of said cylinder to prevent fluid flow therearound, elastic means in said cylinder and bearing against said pistons and the ends of said cylinder to urge said pistons toward said shoulder, and a fluid duct between each end of said cylinder and a central point in said cylinder at said ridge between said pistons, and means for restricting fluid flow through said duct in accordance with an aerodynamic load imposed on said airplane.

2. In an airplane having a control surface moved in accordance with movements of a pilot's control element, a cylinder adapted for holding a fluid, a central ridge in said cylinder extending internally from the cylinder bore, a rod movable with said control element entering said cylinder and having a central shoulder thereon smaller in diameter than the inner diameter of said ridge, a piston slidably mounted on said rod on each side of said shoulder, one of said pistons on each side of said ridge, the periphery of each of said pistons being sealed to the interior of said cylinder to prevent fluid flow therearound, elastic means in said cylinder and bearing against said pistons and the ends of said cylinder to urge said pistons toward said shoulder, a fluid duct between each end of said cylinder and a central point in said cylinder at said ridge between said pistons, and means for restricting fluid flod through said duct in accordance with airspeed.

3. In an airplane having a control surface moved in accordance with movements of a pilot's control element, a cylinder adapted for holding a fluid, a central ridge in said cylinder extending internally from the cylinder bore, a rod movable with said control element entering said cylinder and having a central shoulder thereon smaller in diameter than the inner diameter of said ridge, a piston slidably mounted on said rod on each side of said shoulder, one of said pistons on each side of said ridge, the periphery of each of said pistons being sealed to the interior of said cylinder to prevent fluid flow therearound, elastic means in said cylinder and bearing against said pistons and the ends of said cylinder to urge said pistons toward said shoulder, a fluid duct between each end of said cylinder a central point in said cylinder at said ridge between said pistons, and means for restricting fluid flow through said duct in accordance with vertical accelerations experienced by said airplane.

4. In an airplane having a control surface moved in accordance with movements of a pilot's control element, a cylinder adapted for holding a fluid, a central ridge in said cylinder extending internally from the cylinder bore, a rod movable with said control element entering said cylinder and having a central shoulder thereon smaller in diameter than the inner diameter of said ridge, a piston slidably mounted on said rod on each side of said shoulder, one of said pistons on each side of said ridge, the periphery of each of said pistons being sealed to the interior of said cylinder to prevent fluid flow therearound, elastic means in said cylinder and bearing against said pistons and the ends of said cylinder to urge said pistons toward said shoulder, a fluid duct between each end of said cylinder and a central point in said cylinder at said ridge between said pistons, and means for restricting fluid flow through said duct in accordance with a resultant of airspeed and vertical accelerations experienced by said airplane.

5. In an airplane having a control surface moved in accordance with movements of a pilot's control element, a cylinder adapted for holding a fluid, a rod movable with said control element entering said cylinder and having a central shoulder thereon, a piston slidably mounted on said rod on each side of said shoulder, the periphery of each of said pistons being sealed to the interior of said cylinder to prevent fluid flow therearound, elastic means in said cylinder and bearing against said pistons and the ends of said cylinder to urge said pistons against said shoulder, and a fluid duct between each end of said cylinder and a central point in said cylinder between said pistons, a weight resiliently mounted to move vertically in said airplane when said airplane is level, and a valve member attached to said weight and positioned to intersect said duct, said valve member having an aperture therein registering with said duct when said weight is at rest.

6. In an airplane having a control surface moved in accordance with movements of a pilot's control element, a cylinder adapted for holding a fluid, a rod movable with said control element entering said cylinder and having a central shoulder thereon, a piston slidably mounted on said rod on each side of said shoulder, means preventing travel of each of said pistons, but not said shoulder, toward the other piston beyond a predetermined point in said cylinder, the periphery of each of said pistons being sealed to the interior of said cylinder to prevent fluid flow therearound, elastic means in said cylinder and bearing against said pistons and the ends of said cylinder to urge said pistons toward said shoulder, and a fluid duct between each end of said cylinder and a central point in said cylinder between said pistons, an element resiliently mounted to move in said airplane, a valve member attached to said element and positioned to intersect said duct, said valve member having an aperture therein registering with said duct when said element is at rest, and means for applying a differential pressure derived from the airstream flowing past said airplane to said element in a direction to move said element and said valve member.

7. Apparatus in accordance with claim 6 wherein said valve member is positioned to move vertically in said airplane when the latter is level, and wherein said element has sufficient mass to move in response to vertical accelerations experienced by said airplane in flight.

8. In an airplane having a control surface moved in accordance with movements of a pilot's control element, a cylinder adapted for holding a fluid, a rod movable with said control element entering said cylinder axially, a pair of pistons operating in said cylinder axially thereof, one of said pistons having a one-way driven connection with said rod in one direction and the other piston having a one-way driven connection with said rod in the other direction, elastic means in said cylinder and bearing against said pistons to urge said pistons in opposite directions, respectively, from their rod-driven directions, external fluid duct means between each end of said cylinder beyond each piston and a central point in said cylinder between said pistons, and variable means for restricting fluid flow through said duct means, whereby said restricting means can be controlled by an external control means.

9. In an airplane having a control surface moved in accordance with movements of a pilot's control element, a cylinder adapted for holding a fluid, a rod movable with said control element entering said cylinder axially, a pair of pistons operating in said cylinder axially thereof, one of said pistons having a one-way driven connection with said rod in one direction and the other piston having a one-way driven connection with said rod in the other direction, elastic means in said cylinder and bearing against said pistons to urge said pistons in opposite directions, respectively, from their rod-driven directions, fluid duct means between each end of said cylinder beyond each piston and a central point in said cylinder between said pistons, and means for restricting fluid flow through said duct means in proportion to an aerodynamic load on said airplane, wherein said fluid flow restricting means comprises an element resiliently mounted to move in said airplane, a valve member attached to said element and positioned to intersect said duct means, said valve member having an aperture therein registering with the flow passage of said duct means when said airplane is at rest, and means for applying a force representing said aerodynamic load to said element in a direction to move said element and said valve member to thereby regulate the flow area of said duct means.

JOHN D. McKELLAR.
RONALD E. CRANDALL.

References Cited in the file of this patent

UNITED STATES PATENTS

| Number | Name | Date |
|---|---|---|
| 1,828,383 | Andersen | Oct. 30, 1931 |
| 1,885,578 | Boykow | Nov. 1, 1932 |

FOREIGN PATENTS

| Number | Country | Date |
|---|---|---|
| 321,851 | Great Britain | Dec. 3, 1928 |
| 449,431 | France | Jan. 30, 1913 |
| 569,290 | Great Britain | May 16, 1945 |
| 570,030 | Great Britain | June 19, 1945 |